Aug. 28, 1928.

H. E. PEARSON 1,682,051

MOTOR TOBOGGAN

Filed March 1, 1924

INVENTOR
HERMAN E. PEARSON
By Paul, Paul & Moore
ATTORNEYS

Aug. 28, 1928.
H. E. PEARSON
1,682,051
MOTOR TOBOGGAN
Filed March 1, 1924   2 Sheets-Sheet 2
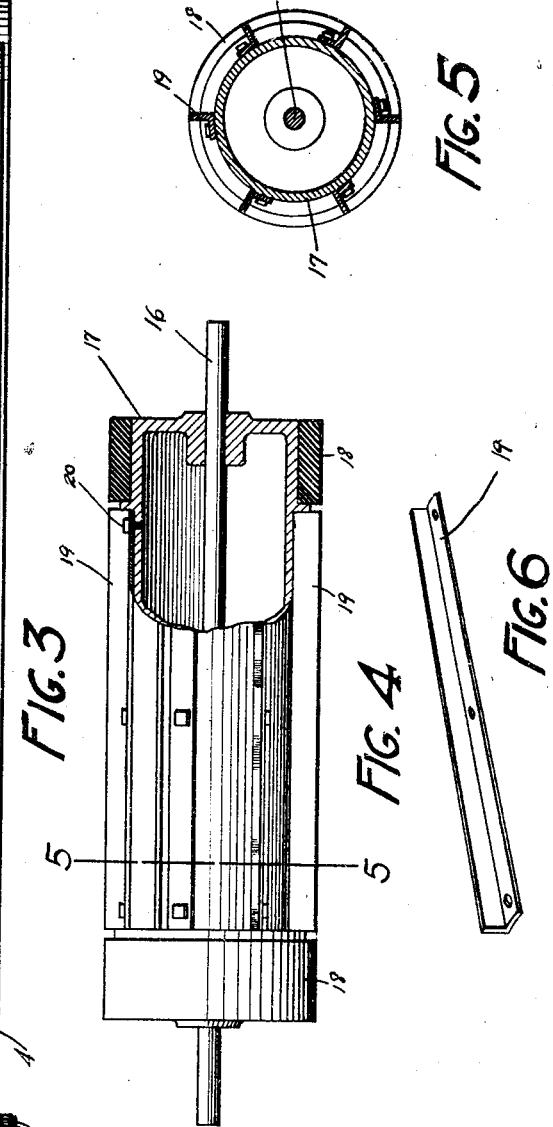
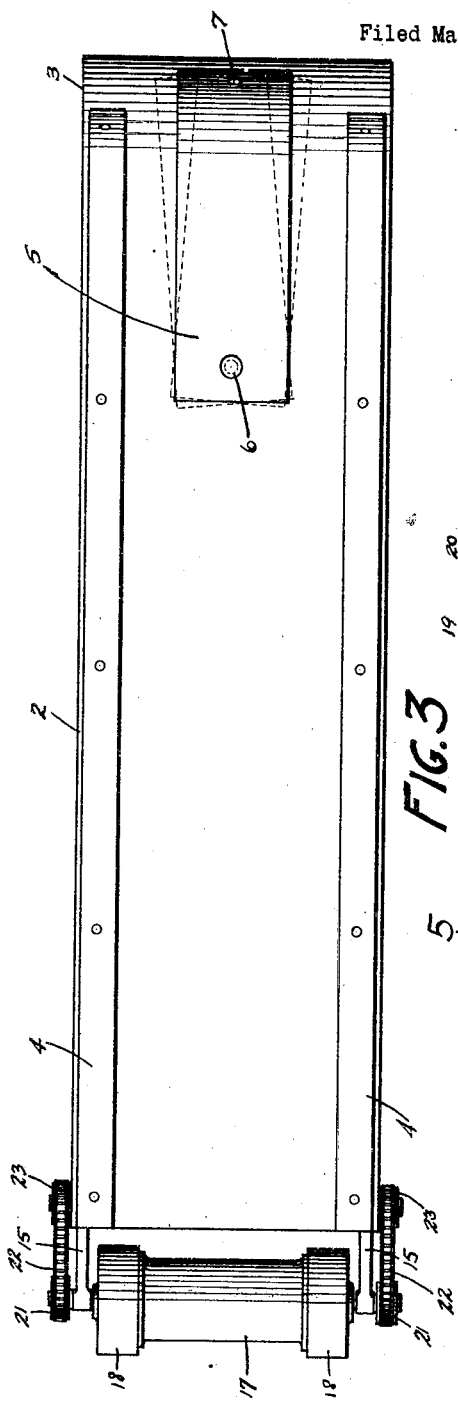
INVENTOR
HERMAN E. PEARSON
By Paul, Paul & Moore
ATTORNEYS Patented Aug. 28, 1928.

1,682,051

UNITED STATES PATENT OFFICE.

HERMAN E. PEARSON, OF WAYZATA, MINNESOTA.

MOTOR TOBOGGAN.

Application filed March 1, 1924. Serial No. 696,358.

The object of my invention is to provide a power-driven toboggan by means of which a person may ride over snow or ice without following any road or beaten path and without paying any attention to whether the snow is hard or soft, except that the driving roller may be adjusted to adapt it particularly for engaging either a hard or soft surface.

A further object is to provide a motor-driven toboggan of simple, inexpensive construction but very strong and durable and able to withstand rough usage to which a device of this kind would be ordinarily subjected.

Other and particular objects of the invention will appear from the following detailed description.

The invention consists generally in various constructions and combinations all as hereinafter described and particularly pointed out in the claims.

In the accompanying drawings forming part of this specification,

Figure 3 is a bottom view;

Figure 4 is a detail view partially in section of the driving roller;

Figure 5 is a sectional view on the line 5—5 of Figure 4 showing the construction of the roller; and Figure 6 is a perspective view of one of the driving rails or bars of the roller removed.

In the drawing:

Figure 1:
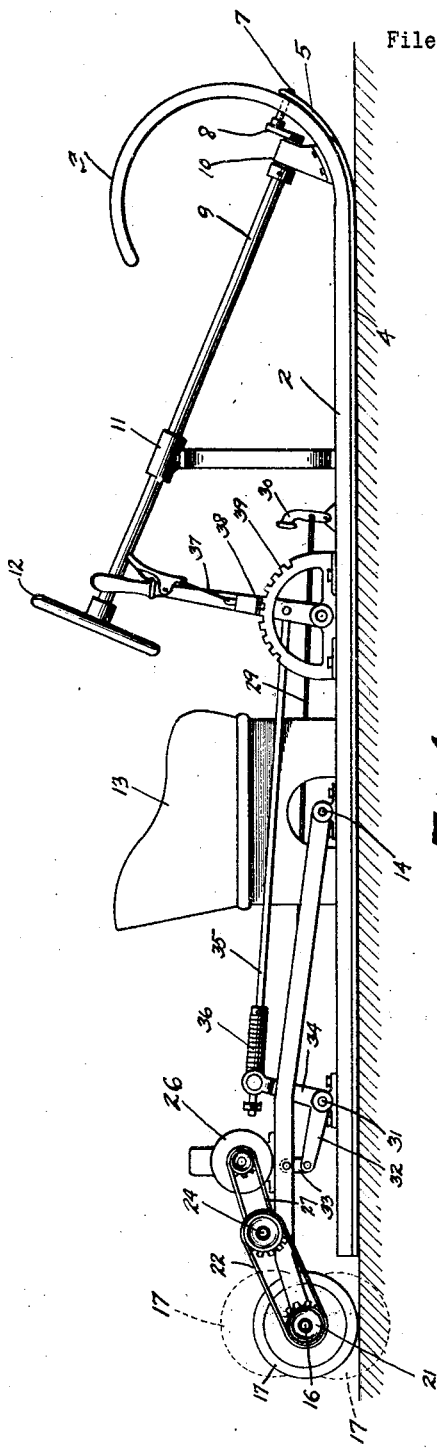
Figure 1 is a side elevation of a motor-driven toboggan embodying my invention.
Figure 2:
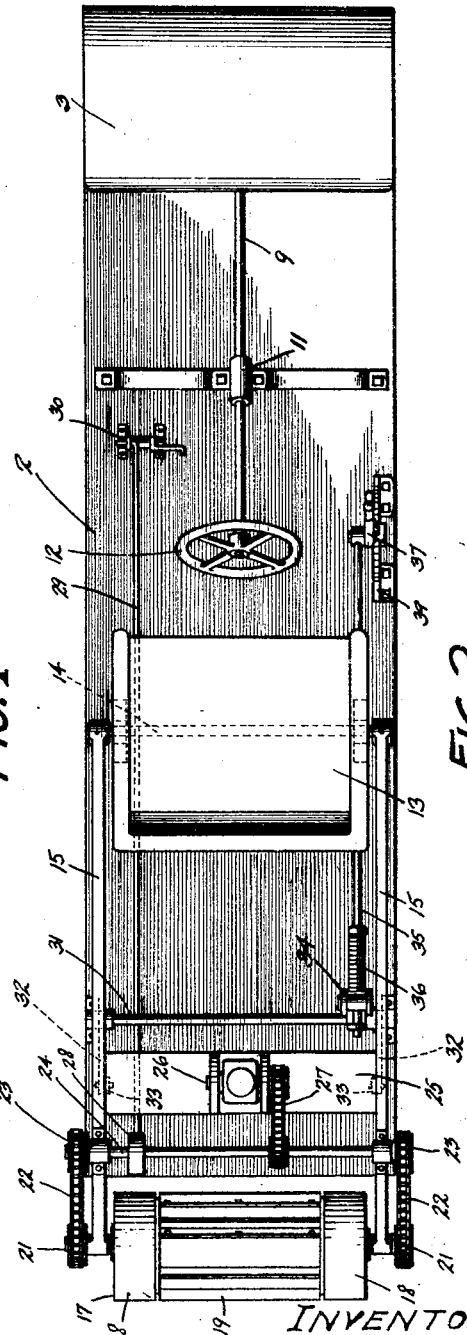
Figure 2 is a plan view of the same.

2 represents the main portion or body of the toboggan of any suitable or preferred construction having the upwardly turned forward end 3 as usual in devices of this kind. The under side of the toboggan is preferably provided with shoes 4 of sufficient thickness to raise the middle portion off the snow or ice, and between the shoes a guideplate 5 is pivoted at 6 and has an upwardly turned forward portion conforming substantially to the curve of the toboggan and connected through the wall of the toboggan by a pin 7 with a crank 8 on the lower end of a steering post 9 mounted in suitable bearings 10 and 11 on the toboggan and provided with a steering wheel 12. By rotating this post the plate 5 is oscillated from side to side to steer the toboggan.

13 represents a suitable driver's seat arranged substantially midway of the toboggan convenient for the driver to grasp the wheel 12. Beneath this seat, is a transverse shaft 14 whereon bars 15 are mounted to extend backwardly over the rear portion of the toboggan and beyond its rear end. A roller shaft 16 is mounted in the rear ends of these bars which are preferably curved or turned down slightly to properly position them for supporting the driving roller. 17 represents the driving roller secured on the shaft 16 and having at each end driving rings 18 of a suitable composition material adapted to contact with a hard surface such as ice or hard snow and grip the same with sufficient pressure to drive the toboggan.

Between these rings, angle bar blades 19 are arranged lengthwise of the roller and spaced apart a suitable distance and secured thereto by suitable means such as bolts 20. These blades are removable and may be discarded in driving over a surface that is suitable for the rings 18 to contact with in driving the toboggan but may be replaced to aid in propelling when the roller is operating in soft snow and it is desired to have the blades dig into the snow and pack it sufficiently to afford sufficient resistance to the revolution of the roller to drive the toboggan.

Sprocket wheels 21 are mounted on the ends of the shaft 16 and sprocket belts 22 connect these wheels with similar wheels 23 on a shaft 24 that is journaled in bearings on the bars 15 adjacent the rear ends thereof and the driving roller. A platform 25 is secured to said bars and supports a source of motive power such as an internal combustion engine 26 and a drive belt 27 connects this engine with the shaft 24. This engine is preferably of the motorcycle type, being strong and reliable and having sufficient power to drive the operating roll, the weight of the engine being utilized to depress the rear ends of the bars 15 and hold the roll down in contact with the surface over which the toboggan is passing. Furthermore, by mounting the engine on the bars 15 the driving roll and the bars are allowed freedom of vertical oscillation to conform to inequalities of the ground without in any way disturbing the driving connections between the engine and the roll. The shaft 24 is preferably provided with a brake drum 28 and a rod 29 leads from this drum to a suitable pedal 30 by means of which the driver can apply the brake to the shaft.

I also prefer to provide a means for raising the driving roller to a non-working position, said means comprising a shaft 31 having crank arms 32 at each end thereof, connected by links 33 with the bars 15. A corresponding crank arm 34 projects upwardly from the shaft 31 and a rod 35 is slidably mounted at one end in said arm and is provided with a compression spring 36. The forward end of said rod is connected to a lever 37 within convenient reach of the driver and provided with a locking latch 38 to engage a quadrant 39 for locking the lever or rod in its different positions. Forward movement of the lever will raise the bars 15 and lift the driving roll out of contact with the snow or ice, and backward movement of the lever will allow the bars to drop and put the spring 36 under compression to yieldingly hold the driving roll down upon the ground, the arms 32 exerting a downward pull on the bars 15 and the driving roll commensurate with the backward pressure of the spring 36 on the arm 34. Thus by the adjustment of the lever 37 the driver is able to increase or decrease the pressure of the driving roll upon the surface over which it is moving. The spring 36 in addition to its function of yieldingly holding the roll to the ice or snow will allow the roll and bars 15 to rise in passing over a rough surface and permit the roll to accommodate itself to inequalities of the surface.

In various ways the details of construction herein shown and described may be modified and still be within the scope of my invention.

I claim as my invention:

1. In combination with a toboggan having a driver's seat substantially intermediately thereof in a lengthwise direction, a frame pivoted at one end substantially beneath the seat and extending rearwardly, said frame having traction means engageable rearwardly of the toboggan, means mounted upon the frame for driving said traction means, means for raising and lowering the frame, including a lever, and rod, said rod extending to a point forwardly of the seat, and an operating lever pivotally engaged with the forward end of the rod, and arranged in front of the driver's seat.

2. In combination with a toboggan having a driver's seat, substantially medially thereof in a lengthwise direction, a frame pivoted at one end substantially beneath the seat and extending rearwardly, said frame having traction means engageable rearwardly of the toboggan, means mounted on the frame for driving said traction means, a bellcrank lever pivoted to the toboggan intermediately between the pivotal point of the frame and the end of the toboggan, said bellcrank having one arm supportingly connected with the frame, a rod slidable through the other arm and extending rearwardly of the arm and having a stop, and further extending to a point forwardly of the seat, a lever pivotally engaged by the forward end of the rod, and a spring upon the rod exerting pressure in a rearward direction against the second arm.

In witness whereof, I have hereunto set my hand this 25th day of February, 1924.

HERMAN E. PEARSON.